United States Patent
Cecchetti et al.

(10) Patent No.: US 11,555,886 B2
(45) Date of Patent: Jan. 17, 2023

(54) METHOD FOR MONITORING THE STABILITY OF AN EXCAVATION FRONT USING RADAR INTERFEROMETRY

(71) Applicant: IDS GEORADAR S.R.L., Milan (IT)

(72) Inventors: Matteo Cecchetti, Pisa (IT); Francesco Coppi, Calcinaia (IT); Matthias Twardzik, Leghorn (IT)

(73) Assignee: IDS GEORADAR S.R.L., Milan (IT)

( * ) Notice: Subject to any disclaimer, the term of this patent is extended or adjusted under 35 U.S.C. 154(b) by 155 days.

(21) Appl. No.: 17/231,929

(22) Filed: Apr. 15, 2021

(65) Prior Publication Data

US 2021/0325511 A1 Oct. 21, 2021

(30) Foreign Application Priority Data

Apr. 16, 2020 (IT) .......................... 102020000008110

(51) Int. Cl.
*G01S 7/40* (2006.01)
*G01S 13/90* (2006.01)

(52) U.S. Cl.
CPC ............ *G01S 7/40* (2013.01); *G01S 13/9023* (2013.01)

(58) Field of Classification Search
CPC .............................. G01S 7/40; G01S 13/9023
See application file for complete search history.

(56) References Cited

U.S. PATENT DOCUMENTS 6,011,505 A * 1/2000 Poehler ............... G01S 13/9019
342/25 C
2022/0221577 A1* 7/2022 Ikefuji ................... G01S 13/904

FOREIGN PATENT DOCUMENTS

| CN | 108627834 A | 10/2018 | |
|---|---|---|---|
| EP | 2413158 A1 * | 2/2012 | ......... G01S 13/9023 |
| EP | 2413158 A1 | 2/2012 | |
| WO | 2010/000870 A1 | 1/2010 | |

OTHER PUBLICATIONS

Fornaro G. et al: "Inversion of Wrapped Differential Interferometric SAR Data for Fault Dislocation Modeling" Jun. 1, 2012.
Italian Search Report and Written Opinion dated Dec. 23, 2020 as received in application No. 102020000008110.
"Advanced observation techniques for sophisticated shallow tunnel projects—experience gained using innovative monitoring methods at the Lainzer Tunnel LT31" (Moritz Bernd et al., "Geomechanik a Tunnelbau: Geomechanik a Tunnelbau" 1.5, 2008, pp. 466-476).

* cited by examiner

*Primary Examiner* — Peter M Bythrow
*Assistant Examiner* — Nazra Nur Waheed
(74) *Attorney, Agent, or Firm* — Maschoff Brennan

(57) ABSTRACT

A method for filtering an interferometric radar acquisition, said method comprising the step of prearrangement of a radar system for carrying out acquisitions of images of a scenario by means of SAR interferometry, the radar system comprising at least one radar sensor arranged to emit and receive a radar signal, a control unit configured to analyse said signal received by said radar sensor by means of interferometric technique, a screen arranged to show to a user said images of said scenario.

11 Claims, 4 Drawing Sheets

METHOD FOR MONITORING THE STABILITY OF AN EXCAVATION FRONT USING RADAR INTERFEROMETRY

FIELD OF THE INVENTION

The present invention relates to the field of monitoring the stability of an excavation face by means of SAR (Synthetic Aperture Radar) interferometry.

In particular, the invention relates to a method for removing effects induced by moving objects in an interferometric image.

DESCRIPTION OF THE PRIOR ART

As well known, in order to monitor the stability of the excavation faces, continuous monitoring devices based on laser technology are currently used. The purpose of these monitoring systems is to provide information on displacements and deformations that are precursors of a possible collapse of the excavation face in order to be able to stop the work by securing personnel and machinery.

In most cases, these laser systems require the installation of optical reflectors that are fixed in correspondence with the areas to be monitored, measuring their position at regular intervals in order to detect any movement with an accuracy of about 1 mm.

However, the installation of reflectors on the excavation face is not very easy due to the continuous processing operations and the continuous evolution of the face itself which force the periodic repositioning of the reflectors. In addition, laser-based systems are easily subject to measurement deterioration in the presence of dust or vapor resulting from excavation operations.

An evolution of this measurement system is represented by the system called OBM, described in "*Advanced observation techniques for sophisticated shallow tunnel projects-experience gained using innovative monitoring methods at the Lainzer Tunnel LT31*" (Moritz Bernd et al., "Geomechanik a Tunnelbau: Geomechanik a Tunnelbau" 1.5, 2008, pp. 466-476), in which a total station is used without applying reflectors on the excavation face. Also, to keep the instrument lens dust-free, a fan is used that constantly blows towards the total station.

However, this system has an accuracy of 2-4 mm, which is significantly lower than laser systems that use optical reflectors, with the risk of reducing the effectiveness of monitoring.

An alternative solution is the use of an interferometric radar, a technology widely used for critical monitoring of landslides in the mining context. Radar interferometry provides displacement measurements with sub-millimeter accuracy and is therefore more effective in detecting the precursors of a possible collapse of the excavation face. At the same time, this technology is less prone to environmental disturbances such as dust and steam.

However, this technology suffers from an important obstacle in case of application on an excavation face, i.e. the presence of disturbances due to machinery operating near the excavation face which produces deterioration of the quality of the radar data, with consequent ineffectiveness in monitoring movements.

SUMMARY OF THE INVENTION

It is therefore an object of the present invention to provide a method for monitoring the stability of an excavation face by means of SAR interferometry which allows to detect displacements with sub-millimeter accuracy even in the presence of moving machinery.

It is also an object of the present invention to provide such a method which allows to filter the interferometric data so as to preserve only the portion of information that can be used for the displacement measurement, avoiding the generation of false alarms due to any disturbances generated by machinery.

It is still an object of the present invention to provide such a method which allows to combine laser measurements and radar interferometric measurements to provide a three-dimensional representation of the displacement data.

These and other purposes are achieved by a method for filtering an interferometric radar acquisition, the method comprising the steps of:
 prearrangement of a radar system for carrying out acquisitions of images of a scenario by means of SAR interferometry, the radar system comprising:
  at least one radar sensor arranged to emit and receive a radar signal;
  a control unit configured to analyse the signal received by the radar sensor by means of interferometric technique;
  a screen arranged to show to a user the images of said scenario;
 by means of said radar system, periodic acquisition of images $S_i$ of the scenario for a number $n_c$ of cycles, with $i=1,2,\ldots,n_c$, each image $S_i$ comprising a number $n_p$ of pixels $P_{ij}$ having spatial coordinates defined with respect to a predetermined reference system, where $P_{ij}$ is the j-th pixel of the i-th image acquired at the i-th cycle, with $j=1,2,\ldots,n_p$.

In particular, at each i-th cycle and for each pixel $P_{ij}$, it is provided an iteration of the steps of:
 calculation of a coherence value $\gamma_{ij}$ arranged to represent the quality of the phase information supplied by a j-th pixel at the i-th cycle;
 comparison of the coherence value $\gamma_{ij}$ with a predetermined minimum coherence value $\gamma_{min}$;
 interferometric calculation of a displacement value $d_{ij}$ of said pixel $P_{ij}$, the displacement value $d_{ij}$ being zero in case that in case that $\gamma_{ij} < \gamma_{min}$;
 calculation of a cumulative displacement value $D_{ij}$ as the sum of the displacement values $d_{ij}$ in the N cycles preceding said i-th cycle, the cumulative displacement value $D_{ij}$ being calculated according to the equation $D_{ij} = \sum_{k=i-N}^{i}(d_{kj})$.

In particular, the coherence value $\gamma_{ij}$ is arranged to represent the degree of correlation of the phase information provided by a j-th pixel at the i-th cycle with the phase information provided by the same pixel in the previous cycle.

Advantageously, each pixel $P_{ij}$ is associated with:
 a mask coefficient $M_{ij}$ arranged to assume a value $M_{ij}$=NaN or a value $M_{ij}$=1, and wherein when $M_{ij}$=NaN the pixel $P_{ij}$ is not shown on the screen and when $M_{ij}$=1 the pixel $P_{ij}$ is shown on the screen;
 a coherence coefficient $m_{ij}$ arranged to assume a value $m_{ij}$=0 in case that $\gamma_{ij} < \gamma_{min}$ or a value $m_{ij}$=1 in case that $\gamma_{ij} \geq \gamma_{min}$.

In particular, at each i-th cycle and for each pixel $P_{ij}$, the steps are provided of:
 evaluation of the value of coherence coefficient $m_{ij}$ in the N cycles preceding said i-th cycle;
 calculation of an over threshold fraction value $f_{ij}$ as the sum of the values of the coherence coefficient $m_{ij}$ in the N cycles preceding said i-th cycle divided the number of cycles N, the over threshold fraction value $f_{ij}$ being calculated according to the equation $f_{ij}=\Sigma_{k=i-N}^{i}(m_{kj}/N)$;

comparison of the over threshold fraction value $f_{ij}$ with a predetermined minimum over threshold fraction value $f_{min}$;

in case that $f_{ij}<f_{min}$, assignment to the pixel $P_{ij}$ of a dynamic mask coefficient $M_{ij}^{D}=M_{ij}=\text{NaN}$.

Advantageously, steps are provided of:

calculation of a power value $W_{ij}$ for each pixel $P_{ij}$ of a predetermined image $S_i$;

comparison, for each pixel $P_{ij}$, of the power value $W_{ij}$ with a predetermined minimum power value $W_{min}$;

in case that $W_{ij}<W_{min}$, assignment to the pixel $P_{ij}$ of a static mask coefficient $M_{ij}^{S}=M_{ij}=\text{NaN}$;

in case that $W_{ij} \geq W_{min}$, assignment to the pixel $P_{ij}$ of a static coefficient of mask $M_{ij}^{S}=1$.

More in particular, following conditions are valid:

if $M_{ij}^{S}=\text{NaN}$ and $M_{ij}^{D}=\text{NaN}$ then $M_{ij}=\text{NaN}$;
if $M_{ij}^{S}=\text{NaN}$ and $M_{ij}^{D}=1$ then $M_{ij}=\text{NaN}$;
if $M_{ij}^{S}=1$ and $M_{ij}^{D}=\text{NaN}$ then $M_{ij}=\text{NaN}$;
if $M_{ij}^{S}=1$ and $M_{ij}^{D}=1$ then $M_{ij}=1$.

Advantageously, steps are provided of:

laser scanning with obtaining a three-dimensional map of the scenario;

projection of each cumulative displacement value $D_{ij}$ on the three-dimensional map of the scenario obtained by the step of laser scanning.

In particular, the radar system is adapted to emit an alarm in case that a cumulative displacement value $D_{ij}$ exceeds a predetermined threshold $D_{max}$.

Advantageously, a step is provided of calculation of the number q of pixels $P_{ij}$ having mask coefficient $M_{ij}=\text{NaN}$, the radar system being adapted to emit an alarm in case that the ratio $q/n_p$ exceeds a predetermined threshold.

Advantageously, at each i-th cycle and for each pixel $P_{ij}$, the steps are provided of:

calculation of an interferogram $I_{ij}$ of the pixel $P_{ij}$ according to the equation $I_{ij}=s_{ij}{}^{*}s_{(i-1)j}{}^{*}$, where $s_{ij}$ is the complex number representing the focused radar data of the j-th pixel of the i-th image and $s_{ij}{}^{*}$ is the complex conjugate of $s_{ij}$;

interferometric calculation of the displacement value $d_{ij}$ as a function of $\arg[I_{ij}]$, wherein $\arg[I_{ij}]$ is the argument of the complex number $I_{ij}$.

In particular, the displacement value $d_{ij}$ is calculated according to the equation $$d_{ij} = -\frac{\lambda}{4\pi} m_{ij} * \arg[I_{ij}],$$

where $\lambda$ is the wavelength of the signal emitted by the radar system.

Advantageously, the coherence value $\gamma_{ij}$ is a spatial coherence value and it is calculated by the equation:

$$\gamma_{ij} = \frac{\langle s_{ij} * s_{(i-1)j}^{*}\rangle_{spat}}{\sqrt{\langle s_{(i-1)j} * s_{(i-1)j}^{*}\rangle_{spat} \langle s_{ij} * s_{ij}^{*}\rangle_{spat}}}$$

were $\langle\ \rangle_{spat}$ is a spatial media mathematical operator operating in a neighbourhood of the j-th pixel, $s_{ij}$ is the complex number representing the focused radar data of the j-th pixel of the i-th image and $s_{ij}{}^{*}$ is the complex conjugate of $s_{ij}$.

BRIEF DESCRIPTION OF THE DRAWINGS

Further characteristic and/or advantages of the present invention are more bright with the following description of an exemplary embodiment thereof, exemplifying but not limitative, with reference to the attached drawings in which.

DESCRIPTION OF SOME PREFERRED EMBODIMENTS

Figure 1A:
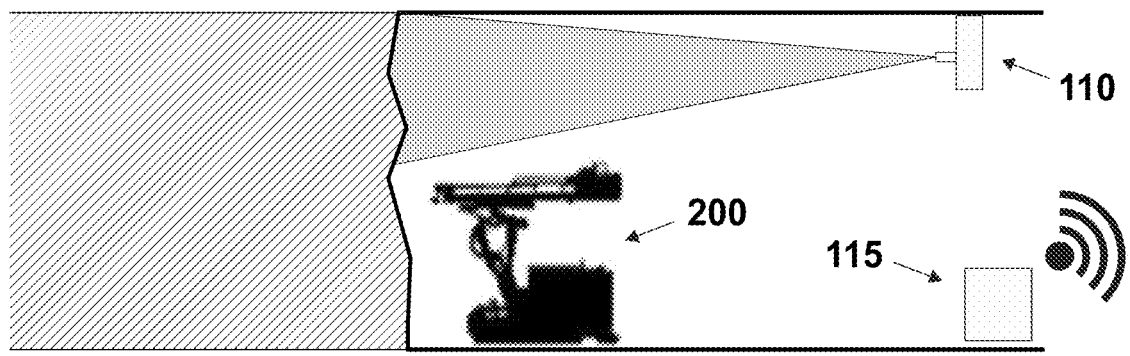
FIG. 1A schematically shows a radar system during the monitoring of an excavation face.
Figure 1B:
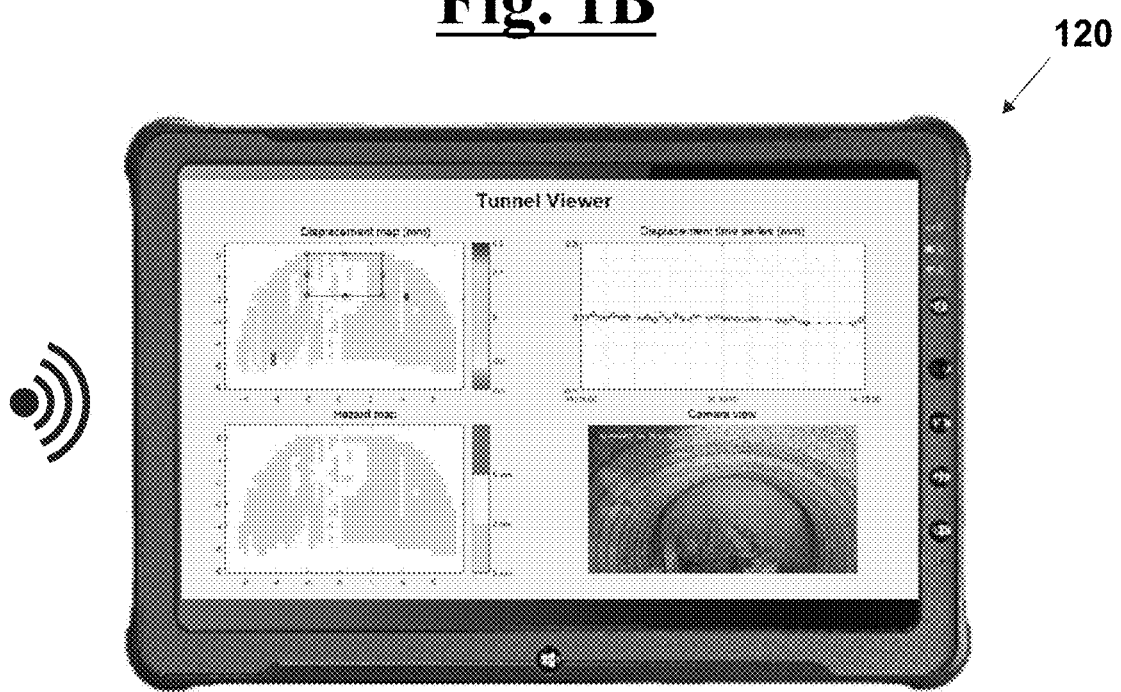
FIG. 1B shows in detail the screen arranged to show the images of the scenario.
Figure 4:
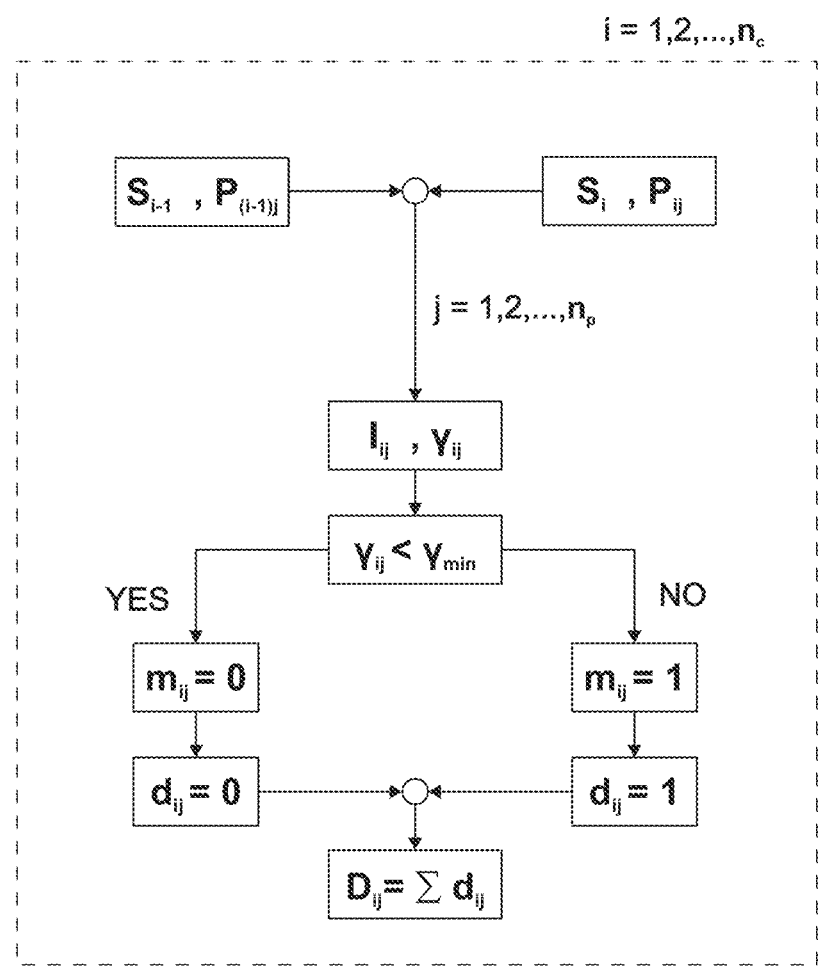
FIG. 4 shows a flow diagram of a possible embodiment of the method according to the present invention.

With reference to FIGS. 1 and 4, in a possible embodiment of the present invention, the method for filtering an interferometric radar acquisition comprises a first step of prearranging a radar system arranged to provide acquisitions of images of the scenario by means of SAR interferometry. In particular, the radar system comprises at least one radar sensor 110 arranged to emit and receive a radar signal and a screen 120 arranged to show the images of the scenario. The radar system also comprises a control unit 115 configured to analyse the received signal by the radar sensor 110 by means of interferometric technique and to send images to the screen 120.

The method then provides a step, by means of the radar system, of periodic acquisition of images $S_i$ of the scenario for a number $n_c$ of cycles, with $i=1,2,\ldots, n_c$. Each image $S_i$ comprises a number $n_p$ of pixels $P_{ij}$ having spatial coordinates defined with respect to a predetermined reference system, where $P_{ij}$ is the j-th pixel of the i-th image acquired at the i-th cycle, with $j=1,2,\ldots, n_p$.

The method then provides a processing, by means of the control unit, of the acquired images by carrying out an iteration of the following steps at each i-th cycle and for each pixel $P_{ij}$.

There is a first step of calculation of the interferogram of a relative pixel $P_{ij}$ according to the equation:

$$I_{ij}=s_{ij}{}^{*}s_{(i-1)j}{}^{*}$$

where $s_{ij}$ is the complex number representing the focused radar data of the j-th pixel of the i-th image and $s_{ij}{}^{*}$ is the complex conjugate of $s_{ij}$.

There is then a step of calculation of a coherence value $\gamma_{ij}$ arranged to represent the quality of the phase information supplied by the j-th pixel at the i-th cycle. In particular, the coherence value $\gamma_{ij}$ is arranged to represent the degree of correlation of the phase information provided by a j-th pixel at the i-th cycle with the phase information provided by the same pixel in the previous cycle.

In one embodiment of the invention, the coherence value can be a spatial coherence value calculated considering the cycle i-th and the previous cycle by the equation:

$$\gamma_{ij} = \frac{\langle s_{ij} * s^*_{(i-1)j}\rangle_{spat}}{\sqrt{\langle s_{(i-1)j} * s^*_{(i-1)j}\rangle_{spat}\langle s_{ij} * s^*_{ij}\rangle_{spat}}}$$

where $\langle\ \rangle_{spat}$ is the spatial media mathematical operator operating in a neighbourhood of the j-th pixel. For example, it can be considered a neighbourhood of 5×5 pixel.

In a subsequent step, the calculated spatial coherence value $\gamma_{ij}$ is compared with a predetermined minimum spatial coherence value $\gamma_{min}$. Each pixel $P_{ij}$ is also associated with a coherence coefficient $m_{ij}$ which can assume a value $m_{ij}=0$ or a value $m_{ij}=1$.

In case that $\gamma_{ij}<\gamma_{min}$, a coherence coefficient value $m_{ij}=0$ is assigned to said pixel $P_{ij}$, whereas, in case that $\gamma_{ij}\geq\gamma_{min}$, a coherence coefficient value $m_{ij}=1$ is assigned to said pixel $P_{ij}$.

There is then a step of interferometric calculation of a displacement value $d_{ij}$ of each pixel $P_{ij}$ according to the equation:

$$d_{ij} = -\frac{\lambda}{4\pi}m_{ij} * \arg[I_{ij}]$$

where $\lambda$ is the wavelength of the emitted signal by the radar system and $\arg[I_{ij}]$ the argument of the complex number $I_{ij}$.

As verifiable by the previous equation, displacement value $d_{ij}$ is zero in case that $m_{ij}=0$.

Finally, there is a step of calculation of a cumulative displacement value $D_{ij}$ as the sum of the displacement values $d_{ij}$ in the N cycles preceding the i-th cycle, i.e. according to the equation:

$$D_{ij} = \sum_{k=i-N}^{i}(d_{kj})$$

The method claimed in the present invention, therefore, by assigning a unitary or null value to the coherence coefficient $m_{ij}$ associated with each pixel $P_{ij}$, allows to exclude from the calculation of the cumulative displacement $D_{ij}$ the pixels that do not have sufficient coherence, i.e. not reliable due to movements of objects with low coherence within the scenario.

Figure 2A:
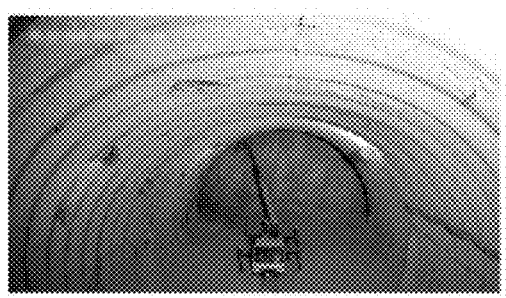
FIG. 2A shows an optical image of a scenario inside a tunnel in which excavation operations are carried out.
Figure 2B:
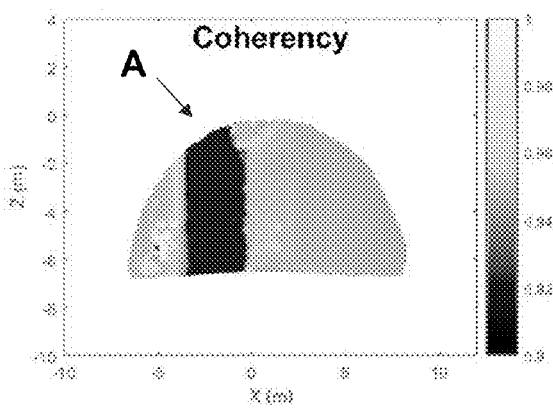
FIG. 2B shows by variation of color intensity a representation of the coherence value of the pixels corresponding to the interferometric image relating to the scenario of FIG. 2A.

For example, the machinery 200 shown in FIGS. 1 and 2A, when turned on, result in objects with low coherence as they vibrate and move very fast with respect to the dimensions of the radar pixels and the scanning time, while the excavation face, for example a tunnel, moves slowly and consistently, and therefore is a highly coherent object. In FIG. 2B it is possible to verify that the zone A, corresponding to the presence of machinery 200 in FIG. 2A, has pixels with low coherence (darker color) as opposed to the pixels of the surrounding zone.

Figure 5:
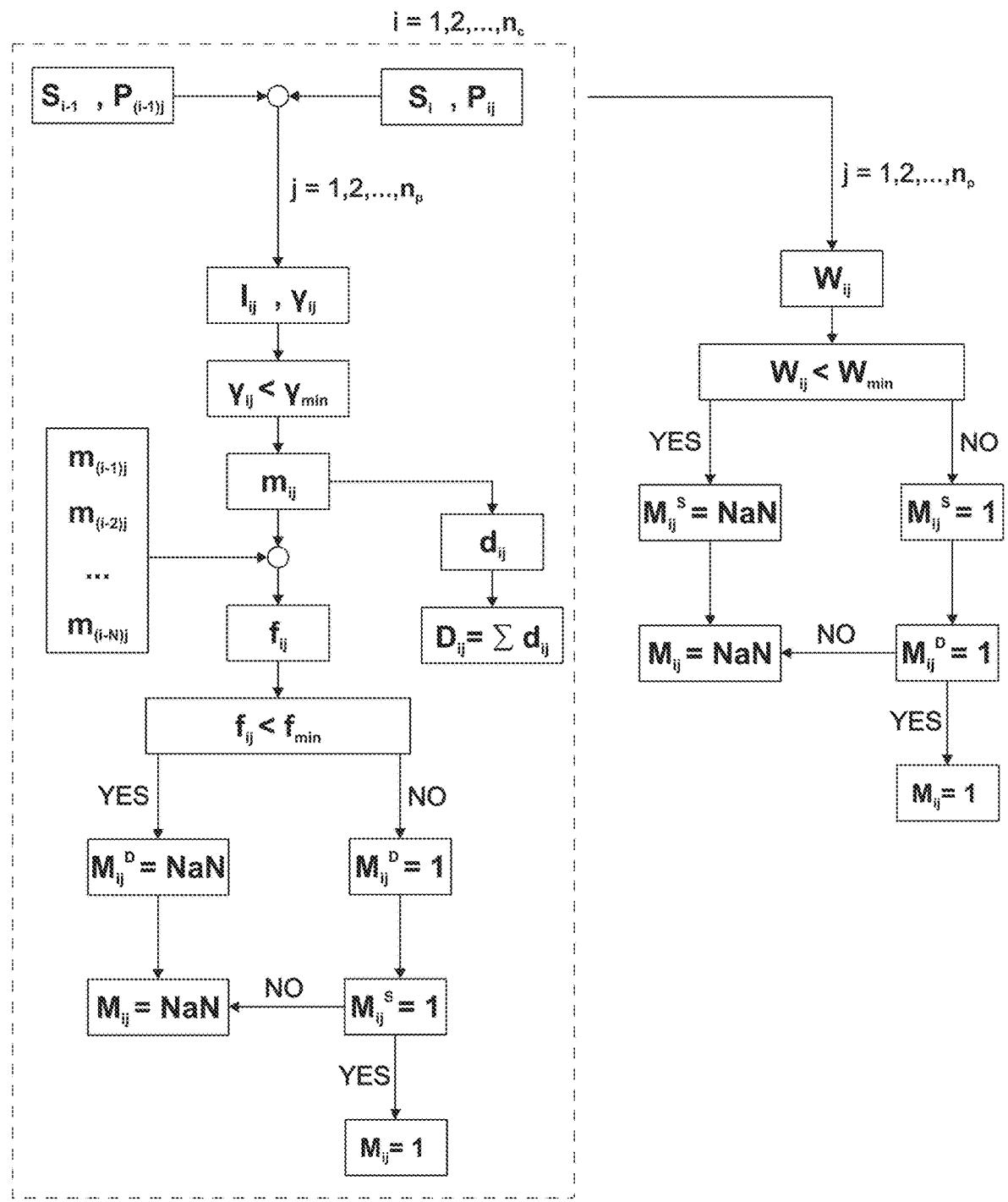
FIG. 5 shows a flow diagram of a possible variant embodiment of the method according to the present invention.

With reference even at FIG. 5, in a variant embodiment of the method according to the present invention, there is also provided an association to each pixel $P_{ij}$ of a mask coefficient $M_{ij}$ arranged to assume a value $M_{ij}=$NaN or a value $M_{ij}=1$, in such a way that the pixel $P_{ij}$ is not shown on the screen 120 when $M_{ij}=$NaN and is instead shown when $M_{ij}=1$.

Such mask coefficient value $M_{ij}$ can therefore determine the non-display of a pixel from the screen, for example, in the event that this pixel has insufficient power (static mask) or has a coherence coefficient value lower than the predetermined threshold for too long (dynamic mask).

In particular, in this variant embodiment, the method provides a static mask filter implemented by means of a first step of calculation of a power value $W_{ij}$ for each pixel $P_{ij}$ of a predetermined image $S_i$, a step of comparison of this power value $W_{ij}$ with a predetermined minimum power value $W_{min}$ and, in case that $W_{ij}<W_{min}$, an assignment to the pixel $P_{ij}$ of a static mask coefficient $M_{ij}^S=$NaN.

This filter in the display of the pixels on the screen 120 is defined as a "static" mask filter, since the aforesaid steps are not iterated at each cycle, but are carried out only when required on a specific image. For example, the static mask filter can be realized both on the first acquired image of the scenario and on the following images, and it has an effect on all subsequent images, as long as a new calculation of the signal power is not made, if necessary.

This calculation is carried out using an image acquired in the complete absence of machinery, in order to measure the signal strength at the excavation face. The static mask filter allows not to show the pixels with too low signal strength, which could give false positives, that is to report displacements that in reality are not taking place but which seem to take place due to a high background noise.

Still with reference to FIG. 5, in this embodiment variant, the method also comprises a dynamic mask filter implemented by an iteration at each i-th cycle and for each pixel $P_{ij}$ of a first step of evaluation of coherence coefficient value $m_{ij}$ in the N cycles preceding the i-th cycle. Then follows a step of calculation of an over threshold fraction value $f_{ij}$ as the sum of the values of coherence coefficient $m_{ij}$ in the N cycles preceding the i-th cycle divided by the number of cycles N, i.e. by means of the equation:

$$f_{ij} = \sum_{k=i-N}^{i}(m_{kj}/N)$$

There is therefore a step of comparison of the over threshold fraction value $f_{ij}$ with a predetermined minimum over threshold fraction value $f_{min}$ and, in case that $f_{ij}<f_{min}$, an assignment to the pixel $P_{ij}$ of a dynamic mask coefficient $M_{ij}^D=$NaN.

This filter in the display of the pixels on the screen 120 is defined as a "dynamic" mask filter, since the aforesaid steps are iterated at each cycle, preventing the display of pixels considered as unreliable as they have had insufficient spatial coherence for several consecutive cycles.

This allows to exclude from the image pixels that could give false negatives, that is to report that no movements are taking place, when in reality they are happening.

As schematized in FIG. 5, if one of the conditions $M_{ij}^S=$NaN or $M_{ij}^D=$NaN is present, there is a mask coefficient $M_{ij}=$NaN and therefore the corresponding pixel are not shown on the screen 120.

Figure 3:
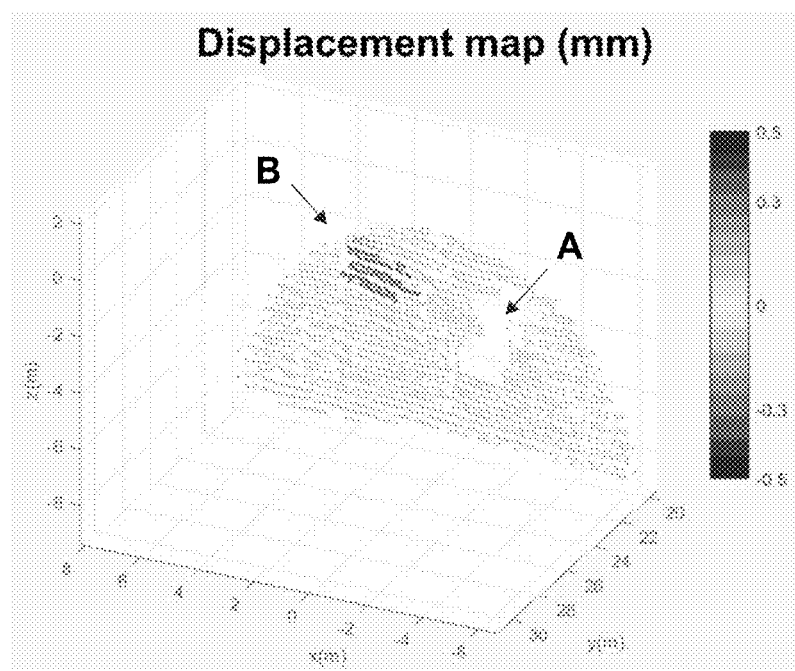
FIG. 3 shows by variation of color intensity a representation of the pixel displacement value projected on a three-dimensional map obtained by laser scanning.

The static and dynamic mask filters therefore allow to view on the screen 120 only the truly reliable pixels, providing the operator with an immediate understanding of the reliability of the image. In FIG. 3 it is possible to see a representation on the screen of the pixel displacement value projected on a three-dimensional map obtained by laser scanning of the scenario. In particular, zone A corresponds to a zone in which the pixels have low coherence and therefore are not displayed on the map, while zone B shows pixels that are having a high displacement. The pixels of zone B have high coherence, therefore it can be excluded that it is a false positive and the measurement of the displacement is reliable.

The foregoing description some exemplary specific embodiments will so fully reveal the invention according to the conceptual point of view, so that others, by applying current knowledge, will be able to modify and/or adapt in various applications the specific exemplary embodiments without further research and without parting from the invention, and, accordingly, it is meant that such adaptations and modifications will have to be considered as equivalent to the specific embodiments. The means and the materials to realise the different functions described herein could have a different nature without, for this reason, departing from the field of the invention. it is to be understood that the phraseology or terminology that is employed herein is for the purpose of description and not of limitation.

The invention claimed is:

1. A method for filtering an interferometric radar acquisition, said method comprising the steps of:
   prearrangement of a radar system for carrying out acquisitions of images of a scenario by means of SAR interferometry, said radar system comprising:
   at least one radar sensor arranged to emit and receive a radar signal;
   a control unit configured to analyse said signal received by said radar sensor by means of interferometric technique;
   a screen arranged to show to a user said images of said scenario;
   by means of said radar system, periodic acquisition of images $S_i$ of said scenario for a number $n_c$ of cycles, with $i=1,2,\ldots,n_c$, each image $S_i$ comprising a number $n_p$ of pixels $P_{ij}$ having spatial coordinates defined with respect to a predetermined reference system, where $P_{ij}$ is the j-th pixel of the i-th image acquired at the i-th cycle, with $j=1,2,\ldots,n_p$;
said method characterized in that, at each i-th cycle and for each pixel $P_{ij}$, it is provided an iteration of the steps of:
   calculation of a coherence value $\gamma_{ij}$ arranged to represent the quality of the phase information supplied by a j-th pixel at the i-th cycle;
   comparison of said coherence value $\gamma_{ij}$ with a predetermined minimum coherence value $\gamma_{min}$;
   interferometric calculation of a displacement value $d_{ij}$ of said pixel $P_{ij}$, said displacement value $d_{ij}$ being zero in case that in case that $\gamma_{ij}<\gamma_{min}$;
   calculation of a cumulative displacement value $D_{ij}$ as the sum of the displacement values $d_{ij}$ in the N cycles preceding said i-th cycle, said cumulative displacement value $D_{ij}$ being calculated according to the equation $D_{ij}=\Sigma_{k=i-N}^{i}(d_{kj})$.

2. A method for filtering an interferometric radar acquisition, according to claim 1, wherein each pixel is associated with:
   a mask coefficient $M_{ij}$ arranged to assume a value $M_{ij}=$NaN or a value $M_{ij}=1$, and wherein when $M_{ij}=$NaN said pixel $P_{ij}$ is not shown on said screen and when $M_{ij}=1$ said pixel $P_{ij}$ is shown on said screen;
   a coherence coefficient $m_{ij}$ arranged to assume a value $m_{ij}=0$ in case that $\gamma_{ij}<\gamma_{min}$ or a value $m_{ij}=1$ in case that $\gamma_{ij}\geq\gamma_{min}$.

3. A method for filtering an interferometric radar acquisition, according to claim 2, wherein, at each i-th cycle and for each pixel $P_{ij}$, the steps are provided of:
   evaluation of said value of coherence coefficient $m_{ij}$ in the N cycles preceding said i-th cycle;
   calculation of an over threshold fraction value $f_{ij}$ as the sum of the values of the coherence coefficient $m_{ij}$ in the N cycles preceding said i-th cycle divided the number of cycles N, said over threshold fraction value $f_{ij}$ being calculated according to the equation $f_{ij}=\Sigma_{k=i-N}^{i}(m_{kj}/N)$;
   comparison of said over threshold fraction value $f_{ij}$ with a predetermined minimum over threshold fraction value $f_{min}$;
   in case that $f_{ij}<f_{min}$, assignment to said pixel $P_{ij}$ of a dynamic mask coefficient $M_{ij}^{D}=M_{ij}=$NaN.

4. A method for filtering an interferometric radar acquisition, according to claim 3, wherein:
   if $M_{ij}^{S}=$NaN and $M_{ij}^{D}=$NaN then $M_{ij}=$NaN;
   if $M_{ij}^{S}=$NaN and $M_{ij}^{D}=1$ then $M_{ij}=$NaN;
   if $M_{ij}^{S}=1$ and $M_{ij}^{D}=$NaN then $M_{ij}=$NaN;
   if $M_{ij}^{S}=1$ and $M_{ij}^{D}=1$ then $M_{ij}=1$.

5. A method for filtering an interferometric radar acquisition, according to claim 2, where the steps are provided of:
   calculation of a power value $W_{ij}$ for each pixel $P_{ij}$ of a predetermined image $S_i$;
   comparison, for each pixel $P_{ij}$, of said power value $W_{ij}$ with a predetermined minimum power value $W_{min}$;
   in case that $W_{ij}<W_{min}$, assignment to said pixel $P_{ij}$ of a static mask coefficient $M_{ij}^{S}=M_{ij}=$NaN;
   in case that $W_{ij}\geq W_{min}$, assignment to said pixel $P_{ij}$ of a static coefficient of mask $M_{ij}^{S}=1$.

6. A method for filtering an interferometric radar acquisition, according to claim 2, wherein a step is provided of calculation of the number q of pixels $P_{ij}$ having mask coefficient $M_{ij}=$NaN and wherein said radar system is adapted to emit an alarm in case that the ratio $q/n_p$ exceeds a predetermined threshold.

7. A method for filtering an interferometric radar acquisition, according to claim 2, wherein, said displacement value $d_{ij}$ is calculated according to the equation $$d_{ij}=-\frac{\lambda}{4\pi}m_{ij}*\arg[I_{ij}],$$

where $\lambda$ is the wavelength of the signal emitted by said radar system.

8. A method for filtering an interferometric radar acquisition, according to claim 1, wherein steps are provided of:
   laser scanning with obtaining a three-dimensional map of said scenario;
   projection of each cumulative displacement value $D_{ij}$ on said three-dimensional map of said scenario obtained by said step of laser scanning.

9. A method for filtering an interferometric radar acquisition, according to claim 1, wherein said radar system is adapted to emit an alarm in case that a cumulative displacement value $D_{ij}$ exceeds a predetermined threshold $D_{max}$.

10. A method for filtering an interferometric radar acquisition, according to claim 1, wherein, at each i-th cycle and for each pixel $P_{ij}$, the steps are provided of:
   calculation of an interferogram $I_{ij}$ of said pixel $P_{ij}$ according to the equation $I_{ij}=s_{ij}*s_{(i-1)j}^{*}$, where $s_{ij}$ is the complex number representing the focused radar data of the j-th pixel of the i-th image and $s_{ij}^*$ is the complex conjugate of $s_{ij}$;

interferometric calculation of said displacement value $d_{ij}$ as a function of $\arg[I_{ij}]$, wherein $\arg[I_{ij}]$ is the argument of the complex number $I_{ij}$.

11. A method for filtering an interferometric radar acquisition, according to claim 1, wherein said coherence value $\gamma_{ij}$ is a spatial coherence value and it is calculated by the equation:

$$\gamma_{ij} = \frac{\langle s_{ij} * s_{(i-1)j}^* \rangle_{spat}}{\sqrt{\langle s_{(i-1)j} * s_{(i-1)j}^* \rangle_{spat} \langle s_{ij} * s_{ij}^* \rangle_{spat}}}$$

where $\langle \ \rangle_{spat}$ is a spatial media mathematical operator operating in a neighbourhood of the j-th pixel, and where $s_{ij}$ is the complex number representing the focused radar data of the j-th pixel of the i-th image and $s_{ij}^*$ is the complex conjugate of $s_{ij}$.

* * * * *